United States Patent
Lindgren

(10) Patent No.: US 10,531,646 B2
(45) Date of Patent: Jan. 14, 2020

(54) APPARATUS FOR DIRECTIONAL POSITIONING OF FISH

(71) Applicant: Peter B. Lindgren, Pompano Beach, FL (US)

(72) Inventor: Peter B. Lindgren, Pompano Beach, FL (US)

( * ) Notice: Subject to any disclaimer, the term of this patent is extended or adjusted under 35 U.S.C. 154(b) by 0 days.

(21) Appl. No.: 15/934,252

(22) Filed: Mar. 23, 2018

(65) Prior Publication Data

US 2018/0206458 A1 Jul. 26, 2018

Related U.S. Application Data

(63) Continuation-in-part of application No. 15/592,886, filed on May 11, 2017, now abandoned.

(60) Provisional application No. 62/432,955, filed on Dec. 12, 2016.

(51) Int. Cl.
*A01K 61/00* (2017.01)
*A01K 61/13* (2017.01)
*F04F 5/10* (2006.01)
*A01K 79/00* (2006.01)

(52) U.S. Cl.
CPC .............. *A01K 61/13* (2017.01); *A01K 79/00* (2013.01); *F04F 5/10* (2013.01)

(58) Field of Classification Search
CPC ........ A01K 61/10; A01K 61/00; A01K 61/13; A01K 79/00
USPC ................................. 119/215, 219, 228, 232
See application file for complete search history.

(56) References Cited

U.S. PATENT DOCUMENTS

| | | | |
|---|---|---|---|
| 4,743,742 A | 5/1988 | Espedalen | |
| 5,313,911 A | 5/1994 | Thomassen et al. | |
| 5,450,818 A * | 9/1995 | Caillouet | A01K 63/04 119/223 |
| 6,880,485 B2 | 4/2005 | Massey et al. | |
| 7,462,016 B2 | 12/2008 | Lindgren | |
| 2017/0172114 A1 | 6/2017 | Halse | |
| 2017/0325432 A1* | 11/2017 | Halse | A22C 25/08 |
| 2018/0153142 A1* | 6/2018 | Hansen | A01K 61/13 |

FOREIGN PATENT DOCUMENTS

| | | |
|---|---|---|
| CA | 2098229 | 12/1994 |
| EP | 3114926 | 1/2017 |
| GB | 2042641 | 9/1980 |
| WO | WO9824304 | 6/1998 |
| WO | WO9941976 | 8/1999 |

(Continued)

*Primary Examiner* — Lisa L Tsang
(74) *Attorney, Agent, or Firm* — McHale & Slavin, P.A.

(57) ABSTRACT

A fish transfer apparatus for directional positioning of fish entering a fish transfer pump reducing injury, stress and enhancing sea lice removal when coupled to a Coanda effect fish transfer pump. The apparatus employs a collection structure constructed from a funnel shaped passageway made of spaced apart bars. A manifold is positioned along an outer surface of the spaced apart bars for directing a flow of water through the passageway at a predetermined position. Fish approaching the apparatus are naturally attracted to the outward flow of water past the ring frame and will enter the passageway as they will be swimming against the current. Once the fish passes the manifold, the fish is subject to the suction caused by the fish transfer pump and drawn into the suction pipe for transfer.

13 Claims, 3 Drawing Sheets

(56) References Cited

FOREIGN PATENT DOCUMENTS

| WO | WO2005124032 | 12/2005 |
| WO | WO2010087722 | 8/2010 |
| WO | WO2011099865 | 8/2011 |
| WO | WO2012148283 | 11/2012 |
| WO | WO2014184766 | 11/2014 |
| WO | WO2015043603 | 4/2015 |

* cited by examiner

APPARATUS FOR DIRECTIONAL POSITIONING OF FISH

PRIORITY CLAIM

In accordance with 37 C.F.R. 1.76, a claim of priority is included in an Application Data Sheet filed concurrently herewith. Accordingly, the present invention is a continuation-in-part, and claims priority, to U.S. patent application Ser. No. 15/592,886 entitled "SEA LICE FISH PUMP" filed May 11, 2017, which claims priority to U.S. Provisional Patent Application No. 62/432,955 entitled "SEA LICE FISH PUMP" filed Dec. 12, 2016. The contents of the above applications are incorporated herein by reference.

FIELD OF THE INVENTION

This invention relates to the fishing industry and, more particularly, to an apparatus for directional positioning of fish before a fish transfer pump.

BACKGROUND OF THE INVENTION

Salmon and many other varieties of fish are now commonly raised in offshore pens. At times the fish may need to be transferred from one area to another for a variety of reasons. For instance, should a net pen need servicing the fish may need to be transferred. When the fish are to be harvested they will need to be transferred. If the fish are affected with sea lice it might be beneficial to transfer them through a cleaning process. An objective of any fish transfer is to perform the transfer will little or no damage to the fish. This includes minimizing the stress on the fish.

The most common way of transferring fish is by pump. Fish are transferred or "pumped" live for grading, transporting, inoculation, or any other reason by the use of specialty pumps. These pumps are typically located on boats, barges and docks, and large hoses are used to enter into the cage housing the fish. The hoses are usually constructed with a metal cone at the suction end. Nets are used to crowd the fish to the cone where they are sucked into the hose.

Fish are preferably transferred using specialty pumps that are capable of moving fluid without an inline impeller. Known pumps include: SILKSTREAM™, TRANSVAC®, and Magic Valley, to name a few. SILKSTREAM™ is a Coanda effect pump as disclosed in U.S. Pat. No. 7,462,016 providing a technology for pumping larger fish in a manner that reduces injury and stress, compared to previous technology, to meet the demands for larger high quality fish.

Conventionally a net is used within the fish pen to crowd the fish wherein the fish are randomly sucked into a fish transfer pump. When fish are drawn through a proper fish pump they are not subjected to any moving parts of the pump. Fish traveling through the fish pump head first pass from a low pressure intake to a high velocity pump area, sea lice which are attached by being hooked to scales are effectively removed by the faster current.

In particular, the SILKSTREAM™ pump enters water to a tube concentrically at a high velocity on a curved cone surface to create inlet suction. For example, a 10 inch pump commonly used on salmon fish requires approximately 2,000 GPM for a 2 meter lift. The inlet water with fish will be approximately 1,500 GPM. The water stream tube surface will triple velocity in less than 4 inches. The SILKSTREAM™ pump has found to be exceptionally beneficial in the removal of sea lice when the fish is drawn through the pump head first.

Sea lice develop through several life stages. During adult and sub adult stages, the sea lice can be mobile and attach to salmon by hooking on scales or with a filament. The velocity difference between the water and the fish remove sea lice. Fish that enter a current head first receive higher velocity water from tail to head, which easily detaches hooked on sea lice and the filament. Fish that enter a current tail first receive a velocity gradient from tail to head and the hooked on lice often stay hooked. Test results for Salmon entering water streams of 0.3 to 1 psi from head to tail produces almost no sea lice removal until over 1 psi while tail to head 0.3 psi is effective to detach lice tested.

It is recognized that captive salmon prefer swimming into water currents when possible because they have very limited ability to travel backward. This is especially true when the fish are being crowded during harvest pumping. The suction of the pump traditionally creates a current that encourages salmon to swim away from the pump suction cone inlet as they draw closer, increasing the probability that the fish is drawn into the pump tail first. In most applications, it is preferred to have fish moved head first.

Thus, what is lacking is an apparatus that can be used with fish pumps at harvest, or for sea lice removal, to assure the fish is facing head first during the fish transfer to minimize or eliminate harming the fish, and maximize sea lice removal with less crowding and stress.

SUMMARY OF THE INVENTION

Disclosed is a fish transfer apparatus for directional positioning of fish entering a fish transfer pump. The properly facing fish is more susceptible to sea lice removal especially when coupled to a Coanda effect fish transfer pump. The apparatus employs a funnel shape, or in particular a collection structure constructed from a circular shaped ring frame having a reducing wall extending from the ring frame. The ring frame forms an inlet with the reducing wall terminating at a fish transfer pump suction pipe. The reducing wall is formed from a plurality of spaced apart bars defining an inner surface for providing a passageway extending from the ring frame to the fish transfer pump suction pipe. A manifold having at least one aperture is used for directing water through the spaced apart bars. The manifold is placed at a predetermined position along the length of the passageway with the flow of water exiting the passageway at the ring frame. Fish approaching the apparatus are naturally attracted to the outward flow of water and will enter the passageway swimming against the current. Once the fish passes the manifold, the fish is subject to the suction caused by the fish transfer pump and drawn into the suction pipe for transfer.

Fish are well known for their instinctive forward movement always against a current. The apparatus of the instant invention allows this forward movement and further allows for delicing when the fish transfer pump includes a Coanda effect pump. Once fish enter the passageway formed by the wall near the suction pipe, spaced apart bars allow water flow current wherein the suction current of a transfer pump overcomes the fish. The passageway past the manifold is sized to prevent the fish from turning around an trying to swim against the suction current.

An objective of the invention is to teach an apparatus that takes advantage of the natural tendency of a fish to swim against a current thereby causing a fish to enter a fish transfer pump head first.

Still another objective of the invention is to teach the use of spaced apart bars to allow positioning of a manifold to create a reverse current before a pump suction.

Yet another objective of the invention is to provide a device that lessens injury and stress to a fish during transfer.

Yet still another objective of the invention is to teach the use of clear bars to form a passageway wall and is less likely to present an avoidance obstacle for a fish.

Another objective of the invention is to teach the use of a Coanda effect pump in combination with the apparatus wherein proper positioning of the fish allows for proper sea lice removal.

Yet still another objective of the invention is to teach an efficient and effective method of removing sea lice during fish transfer to lessen the need for parasite chemicals.

Still another objective of the invention is to orient fish head first for harvesting. Machines that stun fish instantly to help maintain fish freshness and quality require that the fish enter head first for effective treatment. Usually, this takes several crew members to reorient tail first fish exiting the pump. The present invention would reduce the effort and cost of reorienting the fish in many harvesting operations.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
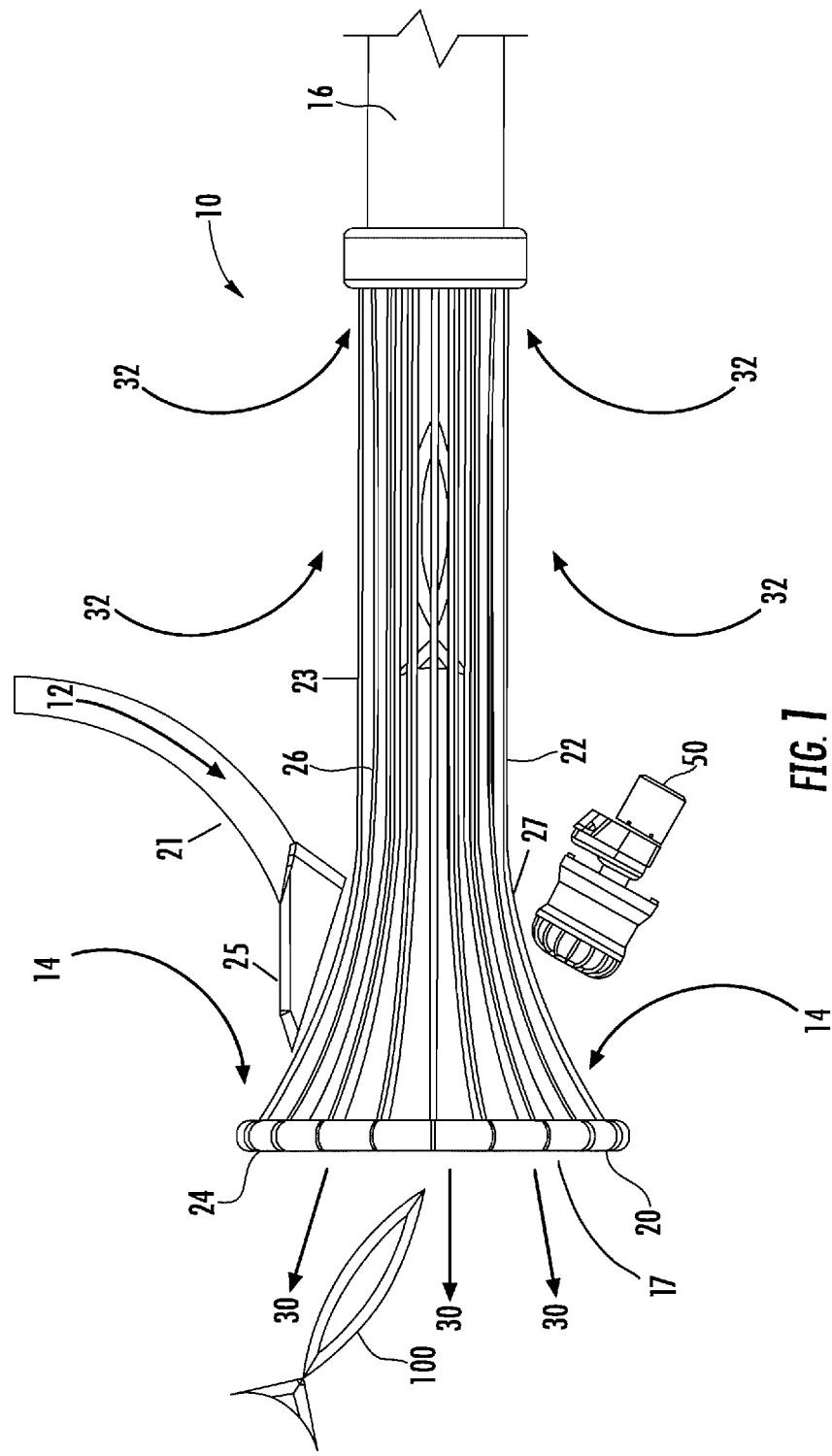
FIG. 1 is a pictorial view of a fish transfer apparatus of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, the fish transfer device 10 of the instant invention operates in conjunction with a fish transfer pump coupled to a fish transfer pump suction pipe 16. Preferably, the fish transfer pump suction pipe 16 is attached to a SILKSTREAM™ fish transfer pump, or the like transfer pump using a Coanda effect providing an advantage of sea lice removal in combination with the fish transfer. The fish transfer pump can be remotely positioned, and the fish transfer pump suction pipe 16 is preferably the end of a flexible pipe coupled to the fish transfer pump, not shown.

The fish transfer device 10 consists of a collection structure 20 formed from a ring frame 24 having a reducing wall 22 extending from the ring frame 24 forming an inlet and terminating at the fish transfer pump suction pipe 16. The reducing wall 22 is formed from a plurality of spaced apart clear or translucent plastic bars 26 which lessen the stress on the fish and more easily encourages the fish to enter the ring frame 24 for entry to the passageway 17. The reducing wall 22 defines an inner surface for providing a passageway 17 having a length extending from ring frame 24 to the fish transfer pump suction pipe 16.

A manifold 21 positioned along an outer surface 23 of the spaced apart bars 26 provides a directional aperture 25 causing water to be directed through the reducing wall 22 to be projected outwardly wherein the current flow of water 30 is forced through the reducing wall 22 by passage between the spaced apart bars 26 and outwardly in the direction depicted by the current flow of water 30. The manifold 21 is placed at a predetermined position, preferably at the base 27 of the collection structure 20 to direct the flow of water 12 through the reducing wall 22 along a length of the passageway 17. The positioning of the aperture 25 projects the water within the passageway 17 to flow outwardly from the inner area between the ring frame 24 and the fish transfer pump suction pipe 16. The flow of water 14 exiting the passageway 17 at the ring frame 24 permits the fish 100 to swim into the flow of water, which is essentially a current flow of water 30 exiting the ring frame 24. It is noted that fish inherently swim upstream, towards a current flow of water. In this embodiment, the flow of water 12 can be created by a remote pump, alternately but not limited to the current created by a propeller. In another embodiment, the current flow of water 30 is created by a pump and motor 50 positioned adjacent to the reducing wall 22.

The current flow of water 30 pushed through spaced apart bars 26 and exiting the ring frame 24 is preferably about 0.3 to 1 feet per second flow rate. In an exemplary embodiment, the flow rate is produced with a 3 inch centrifugal pump with outputs of 200 to 500 GPM, which is sufficient for most fish applications. The fish 100 naturally swim toward the current flow of water 30 in a head first position. The collection structure 20 is preferably constructed of clear or translucent spaced apart bars 26 which lessen the stress on the fish and more easily encourages the fish to enter the collection structure 20 through the opening provided by the ring frame 24. The spaced apart bars 26 are less conspicuous to the entering fish, and are preferably made of acrylic, polycarbonate, or the like material. For increased durability, small metal bars can be used.

Referring to the Figures in general, the collection structure 20, 76 is coupled to the end of the fish transfer pump suction pipe 16, 56 which may be a flexible tube. The collection structure 20, 76 has the reducing wall 22 formed from spaced apart bars 26, 62 configured to allow the current flow of water 30, 54 around the bars 26, 62 and outward from the fish capture ring frame 24, 60 as depicted by current arrows 30, 54. Dependant on the length of the collection structure 20, 76 reinforcement rings 78, 80, 82, and 84 may be used to maintain a spaced separation of the bars 26, 62. Fish 100, with their natural inclination to swim toward the current flow of water 30, 54, enter the ring frame 24, 60 and swim toward the current flow of water 30, 54 produced from the manifold 21, 70. The collection structure 20, 76 reduces the diameter of the ring frame 24, 60 using spaced apart bars 26, 62 extending from the ring frame 24, 60 to the fish transfer pump suction pipe 16, 56, which forms a reducing permeable wall to prevent a fish from turning around. The fish 100 is then sucked into the pump suction pipe 16, 56 as the suction current 32 draws the fish. Proper sizing and distance of the collection structure 20, 76 and fish transfer pump suction pipe 16, 56 must be considered for the size of fish to be pumped.

Figure 2:
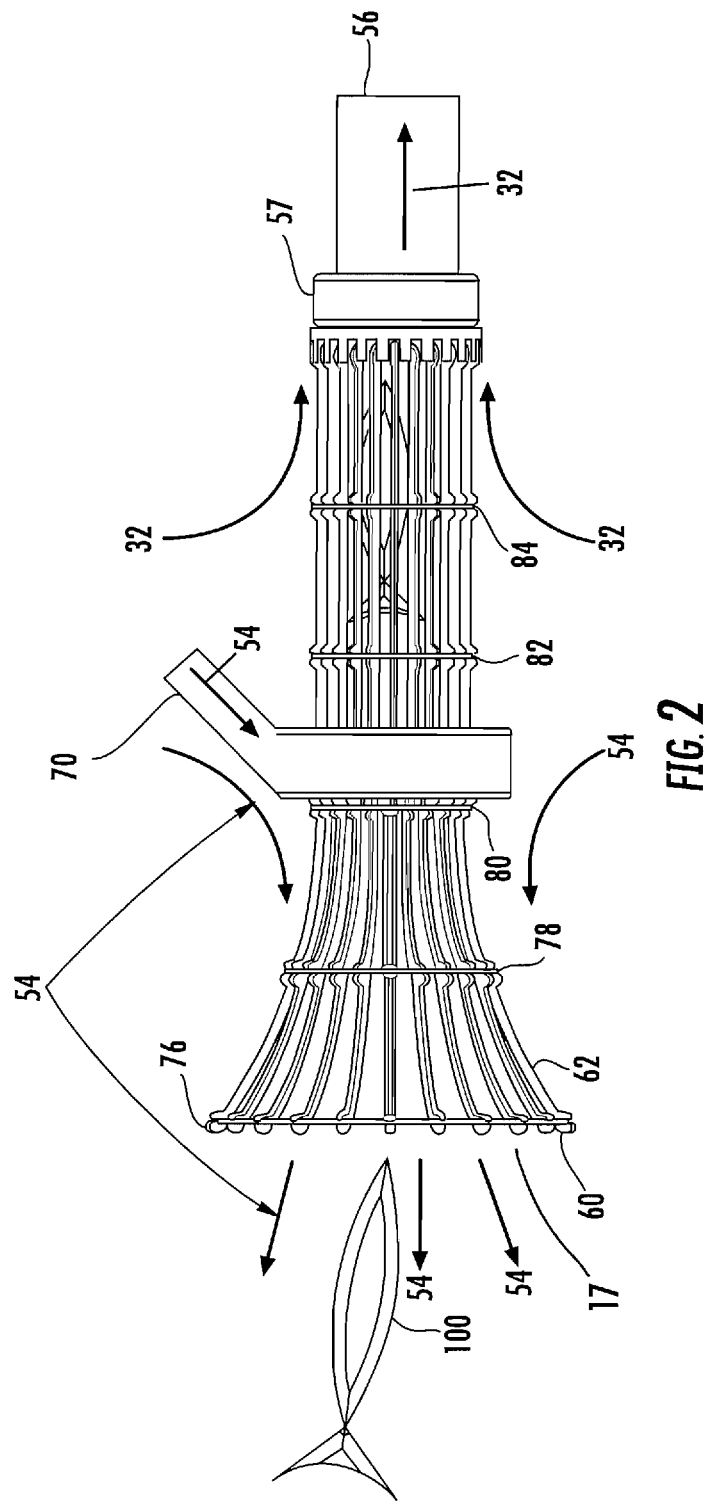
FIG. 2 is a pictorial view of a fish transfer apparatus of the instant invention with a circular input water manifold.
Figure 3:
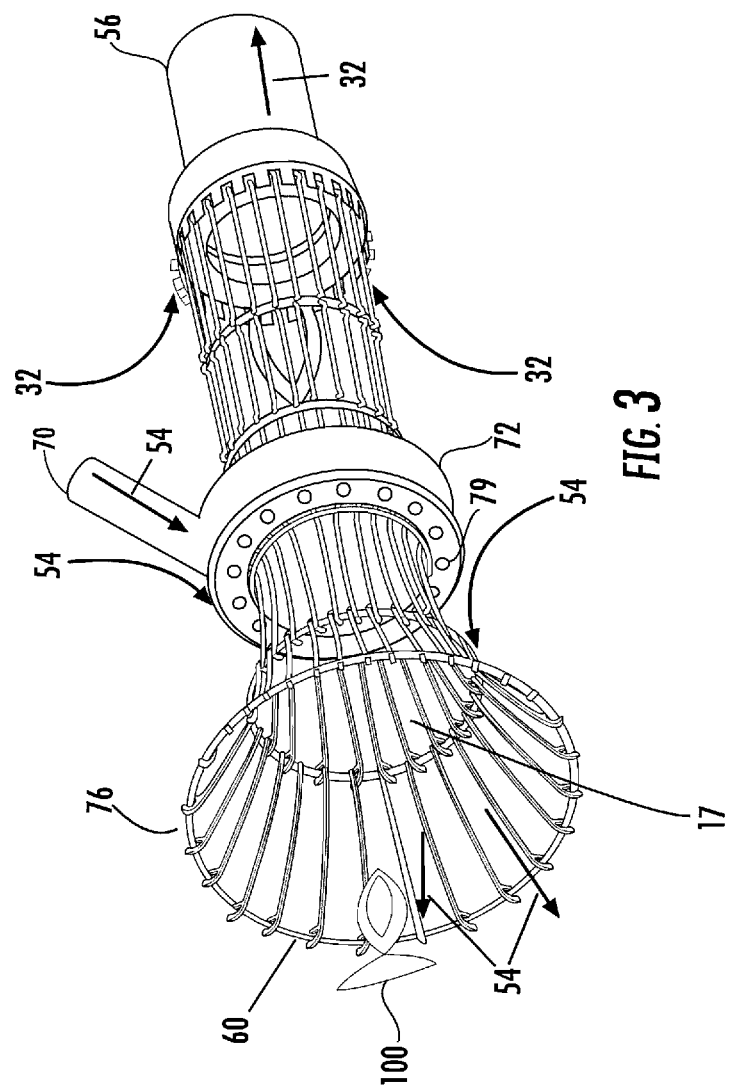
FIG. 3 is a perspective view of FIG. 2.

Referring to FIGS. 2 and 3, an alternative embodiment of the assembly uses a water pump manifold 70 having sufficient volume to create a current 54 opposite the current 32 produced by pump suction pipe 56. Again, in this embodiment, it has been found that a water pump with an output of 200 to 500 GPM can be provided with a 3 inch centrifugal pump creates a current flow 54 of about 0.3 to 1 feet per second. In this embodiment, the pump manifold 70 has a circular shaped distributor 72 with a plurality of outlets 79 for creating a current 54 that passes through the bars 62 that make up the ring frame 60 in this embodiment. Fish 100 naturally swim into this current 54 when crowded thereby entering the ring frame 60 head first.

In this embodiment, clear plastic bars 62 are used to easily encourage the fish to enter the ring frame 60 unstressed. As water flow is provided through the water manifold 70, the circular design of the manifold creates a uniform balanced water flow. In this embodiment, the bars 62 are held in position by stainless steel rings 78, 80, 82 and 84 located along the side wall of the structure for maintaining the spacing for water to flow past the bars 62. The spacing between the bars 62 is small enough to prevent fish escape, yet large enough to allow for the uninhibited passage of water. The bars 62 are less conspicuous to the entering fish when made of clear plastic such as acrylic or polycarbonate, but in most instances the use of metal bars is sufficient. Once the fish 100 passes the manifold 70, the fish are sucked into the inlet tube 57, which can be a modified end attachment to fit a conventional fish transfer pump suction pipe 16. Proper sizing of the ring frame and the inlet tube 57 must be considered for the size of fish to be pumped.

The use of the Coanda effect pump, as taught in U.S. Pat. No. 7,462,016 issued to Lindgren, creates an intake suction current 32 to pump live fish without any moving parts touching the fish. As the fish move from the low pressure suction inlet tube 57 to the high pressure pump area, sea lice attached to a fish traveling head first are effectively removed by a faster current unhooking the lice.

There is an area in the SILKSTREAM™ pump where the water more than doubles on the tubular surface for 1-3 inches. Salmon being deloused will be 15 to 36 inches long and traveling essentially in the center of the accelerated water stream. The faster surface water dislodges the lice attached to the scales and skin of the salmon. The process water is then separated from the fish by passing through spaced apart bars that form a wall. Alternatively the walls may have strategically placed apertures for separating of process water. The water enters into a filtration system to remove the lice prior to returning to the ocean, and the deloused fish return to cages or on to harvesting.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An apparatus for directional positioning of fish entering a fish transfer pump comprising:
    a collection structure constructed from a ring frame having a reducing permeable wall extending from said ring frame and terminating at a fish transfer pump suction pipe, said reducing wall formed from a plurality of spaced apart bars defining an inner surface for providing a passageway having a length extending from said ring frame to said fish transfer pump suction pipe;
    a manifold positioned along an outer surface of said spaced apart bars, said manifold having at least one aperture directing a current flow of water from a position external said spaced apart bars to through said spaced apart bars and into said passageway at a predetermined position along the length of said passageway with the water exiting said passageway at said ring frame;
    wherein a fish approaching said apparatus collection structure will be attracted by said current flow of water past said ring frame causing a head first entry of fish into the passageway, whereby the fish will be subject to a suction caused by the fish transfer pump and drawn into said fish transfer pump suction pipe for transfer.

2. The apparatus according to claim 1 wherein said reducing wall is constructed of a transparent material.

3. The apparatus according to claim 1 wherein said passageway has a diameter constructed and arranged to prevent fish from turning around.

4. The apparatus according to claim 1 wherein the flow of water exiting the passageway at said ring frame is at least 0.3 feet per second.

5. The apparatus according to claim 1 wherein the flow of water exiting the passageway at said ring frame is between 0.3 to 1 feet per second.

6. The apparatus according to claim 1 wherein said manifold is coupled to a remotely located pump.

7. The apparatus according to claim 1 wherein said manifold is coupled to a pump positioned adjacent to an outer surface of said spaced apart bars.

8. The apparatus according to claim 1 wherein said manifold is positioned along an outer diameter of said wall.

9. The apparatus according to claim 1 wherein said manifold is coupled to a fluid flowing device having an output of between 200 and 500 gallons per minute.

10. The apparatus according to claim 1 wherein said spaced apart bars are constructed from a clear plastic.

11. The apparatus according to claim 10 wherein said clear plastic is acrylic or polycarbonate.

12. The apparatus according to claim 1 wherein said spaced apart bars are constructed from metal.

13. The apparatus according to claim 1 wherein said fish transfer pump is a Coanda effect fish transfer pump.

* * * * *